United States Patent [19]

Sreenivasan et al.

[11] 4,414,234
[45] Nov. 8, 1983

[54] NATURALLY COLORED OLEOMARGARINE

[75] Inventors: Baratham Sreenivasan, Paramus; Kenneth S. Baker, Tenafly, both of N.J.

[73] Assignee: Lever Brothers Company, New York, N.Y.

[21] Appl. No.: 273,538

[22] Filed: Jun. 15, 1981

Related U.S. Application Data

[62] Division of Ser. No. 107,745, Dec. 26, 1979, Pat. No. 4,304,792.

[51] Int. Cl.$^3$ ............................................. A23L 1/275
[52] U.S. Cl. .................................. 426/540; 426/250; 426/603
[58] Field of Search ............... 426/250, 540, 607, 603, 426/613

[56] References Cited

U.S. PATENT DOCUMENTS

| | | | |
|---|---|---|---|
| 59,975 | 11/1866 | Dake | 426/540 |
| 726,334 | 4/1903 | Nelson | 426/250 |
| 1,920,231 | 8/1933 | Adler | 426/250 |
| 2,042,173 | 5/1936 | Files | 426/540 |
| 2,539,457 | 1/1951 | Methany | 426/250 |
| 2,717,210 | 9/1955 | de Witte | 426/540 |
| 3,336,141 | 8/1967 | Frisina | 426/250 |

FOREIGN PATENT DOCUMENTS 1049539 of 0000 United Kingdom ............... 426/540

OTHER PUBLICATIONS

Marmion, R. Handbook of US Colorants for Foods Drugs and Cosmetics, John Wiley & Sons N.Y. pp. 74, 75, 76 & 88.

Anderson et al., Margarine, Pergamon Press, N.Y. 1954, p. 127.

Primary Examiner—Jeanette M. Hunter
Attorney, Agent, or Firm—James J. Farrell

[57] ABSTRACT

A natural food colorant composition is disclosed which is particularly useful for natural oleomargarine in that it imparts a pleasant yellow color to the margarine with essentially no migration of the color to the margarine container or wrapper. The colorant composition is a mixture of an edible material of natural origin having a predominantly reddish hue, such as annatto, paprika or the like, with an edible material of natural origin having a predominantly yellowish hue, such as palm oil, carrot oil, corn gluten, saffron or the like.

2 Claims, No Drawings

NATURALLY COLORED OLEOMARGARINE

This is a divisional application of Ser. No. 107,745 filed Dec. 26, 1979, now U.S. Pat. No. 4,304,792.

This invention broadly relates to providing a natural, non-migrating yellow food colorant to margarines. More particularly, this invention is concerned with mixing natural, edible materials of two colors, one of a predominantly reddish shade and another of a predominantly yellow shade, in adequate proportions to produce the desired shade in the final product while eliminating color migration to the margarine wrapper or container.

Most commercial margarines are colored with synthetic $\beta$-carotene because of its purity, ready availability and Vitamin A activity. It is generally used at a level of 4000–6000 I.U. per lb and imparts shades from light yellow to orange yellow to the margarine because of its synthetic nature, however, it has no applicability as a natural food additive.

The FDA has permitted many color additives for foods (CFR 21 Part 73.1–73.615 PP 204–218, 1978) derived from natural sources such as annatto, carrot oil, oleo resins turmeric and paprika, corn gluten (endosperm) oil, saffron, and the like, besides $\beta$-carotene. The natural red color of palm oil has also been suggested for coloring margarines by Anderson, in "Margarine", Pergaman Press, London, 1954 p. 107. Annatto has been used to color butter, margarine and cheese and has been reported to produce a reddish shade by Anderson et al in U.S. Pat. No. 2,793,124 and by Geminder and Macdonough, JAOCS, 34, 314–318, 1957. Turmeric has been recommended as a coloring for fats and fatty foods by Sair et al, U.S. Pat. No. 3,340,250 but has been observed to produce a greenish cast by Jackel and Horn, U.S. Pat. No. 3,940,504. They overcome this by an admixture with paprika. Mixtures of carotene and the extracts and annatto and tumeric on a dry milk powder base has also been suggested as a yellow colorant for margarines by Files, U.S. Pat. No. 2,042,173.

It is thus clear that several investigators have addressed the problem of producing a desirable shade of yellow.

Problems such as the greenish cast imparted by turmeric and the reddish hue of annatto have been overcome without delineating the underlying cause. It has been found that employing turmeric results in a migration of yellow color to the wrapper of margarine and thus is not completely satisfactory in this regard. In addition, turmeric as well as palm oil and carrot oil produce a greenish cast in margarines.

Accordingly, it is an object of this invention to provide a mixture of natural colorants imparting a desirable yellow color to margarine while masking undesirable greenish shades with the concomitant advantage of substantially reducing or completely preventing transfer or migration of color to the margarine wrapper or container.

Other objects and advantages will appear as the description proceeds.

The attainment of the above objects is made possible by the utilization of a mixture of at least two edible products of natural origin which will not detract from the taste of oleomargarine and which will not migrate to the margarine container or wrapper. One of these products has a predominantly reddish hue while at least one of the other products has a predominantly yellowish hue.

More specifically, a combination of A about 0.1% to about 0.5% corn gluten or about 1% to about 3% mildly processed palm oil or about 0.02% to about 0.2% carrot oil with B about 0.001% to about 0.05% annatto extract or about 0.001 to about 0.05% oleo resin of paprika.

The carrot oil concentration can be calculated by a proportion. For example commercial grade carrot oil is sold as either 10,000 c.v. or 100,000 c.v. units. It has been determined that the 10,000 c.v. unit carrot oil is equivalent to 14,000 to 15,000 I.U. of $\beta$-carotene/gm. Thus, assuming an equivalence of 14,500 I.U. of $\beta$-carotene for 10,000 c.v. carrot oil, then 10,000 c.v. carrot oil at a level of 3000 I.U. of $\beta$-carotene is equivalent to 0.0456% of carrot oil per pound or margarine.

While the synthetic $\beta$-carotene employed by the art is a pure substance, it is not natural because of its synthetic nature. Natural sources of carotenes are a mixture of carotenoids. Thus, palm oil has been reported to contain significant amount of $\alpha$-carotene (Muller-Mulot, Fette Seifen Anstrich Mittel 78(1) 18–22, 1976). The use of $\alpha$-carotene as a colorant imparts a greenish cast to margarine. $\beta$-carotene on the other hand produces no such green color but only a yellow to yellow orange color. It is thus thought that the green color produced by carrot oil, palm oil, etc. is due to the presence of $\alpha$-carotene.

Colorants such as annatto, paprika, tomato powder extract and the like mainly impart a pinkish shade at low levels of a reddish shade at higher levels. Colorants such as carrot oil, turmeric, corn gluten oil, palm oil, etc. chiefly impart shades of light yellow to deep yellow with a greenish cast. By a proper mixture of one of the colorants from the first group (annatto etc.) with that from the second group (carrot oil, etc.), any desired shade from yellow to yellow orange can be achieved. However, since turmeric color migrates to the wrapper, it is not suitable for stick (print) margarines. Thus, by use of the present invention one can produce a desirable shade of color by blending two natural colorants, one chosen from a predominantly red color group of annatto, paprika, beet powder, and the like and another from the predominantly yellow color group of palm oil, carrot oil, corn gluten oil, marigold flower extract, and the like. By proper selection the natural undesirable shades such as pinkish, reddish or greenish may be easily compensated for and the resultant shade will be a desirable yellow to yellow orange.

The natural coloring materials of the invention do not migrate to the wrapper when used as a colorant for a stick (print) margarine or discolor white tubs with tub margarines.

Print margarine is wrapped in a foil laminated with tissue paper. The paper employed is about 15 to 17 lb. bleached white sulfite paper such as that marketed by Scott Paper Company under the name "wet strength" tissue.

The coloring agents employed in the instant invention are obtained commercially after, in many cases, special treatment. For example, the commercial palm oil used in margarines is heavily processed, thus destroying all of its colorants. The palm oil employed as a coloring agent in this invention is only lightly processed to retain as much of the native colors as is feasible (see Andersen "Margarine" supra).

To prepare margarines utilizing the colorants of this invention a typical margaraine consisting of partially hydrogenated soybean oil and palm oil blended with liquid corn and sunflower oils and lecithin is mixed with appropriate amounts of the natural coloring agents. Milk and salt are then added to the blend which is then flavored with natural butter flavors and is fortified with natural Vitamins A and D to form an oleomargarine emulsion. The emulsion is then chilled and processed in the conventional manner. The resulting margarine is visually evaluated for color by comparison to standard commercial margarine which in turn are colored by synthetic β-carotene. The results are reported in the following tables and Examples.

The following Examples will more fully illustrate the embodiments of this invention. All parts, percentages and proportions referred to herein and in the appended claims are by weight unless otherwise indicated.

All raw materials were analyzed for absorption at 465 mm which is reported as β-carotene. This served two purposes, one as a basis of comparison, and another as a basis to determine use levels. It is of course realized that the overall color is produced by a mixture of carotenoids and other coloring compounds such as flavonoids and therefore, the use levels with different colorants vary widely.

TABLE I
RAW MATERIALS

| Raw Material | Commercial Grade | I.U. β-carotene*/gm. |
|---|---|---|
| Palm Oil | Mildly processed | 350–550 |
| Carrot oil | 10,000 c.v. units** | 14,000–15,000 |
| | 100,000 c.v. units | 140,000–150,000 |
| Annatto | A fine suspension of seed extract in oil | 140,000–142,500 |
| Paprika | 40,000 c.v. units* | 34,000 |
| | 80,000 c.v. units* | 59,000 |
| Turmeric | Food extract suspended in oil | 15,000–15,500 |
| Corn-endosperm oil | Corn gluten oil | 9,800 |
| β-carotene | 30% paste | 500,000 |
| α-carotene | Synthetic | 3,400 |

*β-carotene content is measured by dissolving the sample in chloroform and reading the absorbance at 465 nm. The β-carotene content is read off a standard curve prepared by dissolving known amounts of β-carotene in the solvent.
**c.v. units are color value units. This is a trade designation which is a measure of concentration.

EXAMPLE I—COMPARATIVE

Refined and bleached palm oil is mildly deodorized so as to produce an oil high in color yet of acceptable flavor. This oil is used at different levels in the margarine and the margarine evaluated visually for color migration of color to the wrapper on storage at 45° F. from overnight to several days.

| *Colorant/Level | Shade of Color | Wrapper Staining |
|---|---|---|
| 1. 0.66% Palm oil | Very light yellow with a faint greenish cast | None |
| 2. 1.32% Palm oil | Light yellow with light greenish cast | None |
| 3. 1.98% Palm oil | Orange yellow with a greenish cast | None |

*The standard margarines for color comparison are those made using about 5000–5500 I.U. β-carotene/lb., i.e. commercial margarines without using natural color.

These experiments show that the use of mildly processed palm oil as a colorant is not completely satisfactory due to its greenish cast.

Palm oil is reported to contain α-carotene among its color bodies (Muller-Mulot Fette Seifen Anstrich Mittel 78(1) 18–22, 1976). A comparative evaluation of synthetic α and β-carotene at about the same level is made to determine the effect of α-carotene.

EXAMPLE II

| Colorant/Level | Shade of Color | Wrapper Staining |
|---|---|---|
| 1. Synthetic β-carotene 5500 I.U./lb | Light orange (Commercial margarine) | None |
| 2. Synthetic α-carotene at level equivalent to 5500 I.U. β-carotene | Yellow with a strong greenish cast | None |
| 3. Palm oil color 1.7% | Light yellow with greenish cast | None |

The above series of experiments in Example II establish that the greenish cast is due to α-carotene. To mask this greenish color, addition of another natural colorant with a predominantly red shade is explored. In this regard, mixtures of palm oil color and annatto are discovered to produce the desirable shade as shown in Example III.

EXAMPLE III

| Colorant/Level | Shade of Color | Wrapper Staining |
|---|---|---|
| 1. Palm oil 1.0% Annatto 0.007% | Light yellow with reddish cast | None |
| 2. Palm oil 1.2% Annatto 0.008% | Yellow with a reddish cast | None |
| 3. Palm oil 1.5% Annatto 0.0045 | Light yellow orange | None |
| 4. Palm oil 1.7% Annatto 0.005% | Light yellow orange | None |
| 5. Palm oil 2.7% Annatto 0.0055% | Yellow orange | None |
| 6. Palm oil 3% Annatto 0.006% | Yellow orange | None |
| 7. Palm oil 1.8% Annatto 0.0054% | Light yellow orange | None |
| 8. Annatto 0.00075% | Yellow pinkish red | None |
| 9. Annatto 0.0059% | Yellow pinkish | None |

The above series show that annatto can mask the greenish cast in palm oil and produce the desirable shading light yellow to yellow orange, Numbers, 1, 2, 8 and 9 are not satisfactory.

EXAMPLE IV—COMPARATIVE

| Colorant/Level | Shade of Color | Wrapper Staining |
|---|---|---|
| 1. Turmeric 0.005% | Deep yellow with greenish cast | Considerable yellow staining of wrapper |
| 2. Turmeric 0.0025% | Yellow with greenish cast | Staining of wrapper to a yellow color |
| 3. Turmeric 0.0025% Annatto 0.006% | Orange yellow | Yellow stain on wrapper |
| 4. Turmeric 0.0025% Annatto 0.005% | Light orange yellow | Yellow stain on wrapper |

Turmeric itself has a greenish cast and stains the wrapper. Addition of annatto counteracts the greenish cast but does not prevent staining. Thus, turmeric by itself or in admixture with another predominantly red colorant is not suitable for coloring margarine.

Carrot oil is employed in Example V.

EXAMPLE V

| | Colorant/Level | Shade of Color | Wrapper Staining |
|---|---|---|---|
| 1. | Carrot oil (10,000 c.v.) at 3400 I.U. | Light yellow with faint greenish cast | None |
| 2. | Carrot oil (10,000 c.v.) at 5000 I.U. | Yellow with a light greenish cast | None |
| 3. | Carrot oil (10,000 c.v.) at 5500 I.U. | Yellow with light greenish cast | None |
| 4. | Carrot oil (10,000 c.v.) at 6000 I.U. | Yellow with light greenish cast | None |
| 5. | Carrot oil (10,000 c.v.) at 4500 I.U. Annatto 0.003% | Yellow | None |
| 6. | Carrot oil 10,000 c.v. 3000 I.U. Annatto 0.003% | Light yellow | None |
| 7. | Carrot oil 10,000 c.v. 3000 I.U. Annatto 0.004% | Light yellow orange | None |
| 8. | Carrot oil 10,000 c.v. 3000 I.U. Paprika 40,000 c.v. 0.011% | Light orange | None |
| 9. | Carrot oil 10,000 c.v. 3000 I.U. Paprika 40,000 c.v. 0.023% | Orange with reddish tinge | None |
| 10. | Carrot oil 100,000 c.v. 5000 I.U. | Yellow very faintly green | None |
| 11. | Carrot oil 100,000 c.v. 5500 I.U. | Yellow very faintly green | None |

Experiments 1, 2, 3, 4, 10, and 11 are unsatisfactory because of the greenish cast.

From the above information it is evident that carrot oil in admixture with annatto or paprika is a suitable colorant for margarines.

Corn gluten oil is employed as a colorant in Example VI.

EXAMPLE VI

| | Colorant/Level | Shade of Color | Wrapper Staining |
|---|---|---|---|
| 1. | Corn gluten oil 0.2% | Straw yellow with faint greenish cast | None |
| 2. | Corn gluten oil 0.25% | Light yellow with faint greenish cast | None |
| 3. | Corn gluten oil 0.3% | Yellow with light greenish cast | None |
| 4. | Corn gluten oil 0.2% Paprika 40,000 c.v. 0.015% | Light yellow with reddish cast | None |
| 5. | Corn gluten oil 0.2% Paprika 40,000 c.v. 0.005% | Light yellow with light pink cast | None |
| 6. | Corn gluten oil 0.2% Annatto 0.004% | Light yellow | None |
| 7. | Corn gluten oil 0.25% Annatto 0.004% | Light yellow orange | None |

Experiments 1, 2, 3, 4 are unsatisfactory but at higher levels of paprika and annatto, corn gluten oil is a suitable colorant for margarine.

Combinations of carrot oil and paprika are employed as well as carrot oil and capsicum.

EXAMPLE VII

| | Colorant/Level | Shade of Color | Wrapper Staining |
|---|---|---|---|
| 1. | Carrot oil 10,000 c.v. 2600 I.U. Paprika 40,000 c.v. 0.007% | Reddish-Yellow | None |
| 2. | Carrot oil 10,000 c.v. 2600 I.U. Paprika 40,000 c.v. 0.006% | Slightly reddish-yellow | None |
| 3. | Carrot oil 10,000 c.v. 2600 I.U. Paprika 40,000 c.v. 0.005% | Slightly reddish-yellow | None |
| 4. | Carrot oil 10,000 c.v. 2600 I.U. Paprika 40,000 c.v. 0.0004% | Orange-yellow | None |
| 5. | Carrot oil 10,000 c.v. 2600 I.U. Capsicum 0.005% | Orange-red-yellow | None |
| 6. | Carrot oil 10,000 c.v. 2600 I.U. Capsicum 0.004% | Light orange to yellow | None |

Experiments 1 and 2 are unsatisfactory due to the reddish color imparted.

The results of Examples I through VII clearly show that a desirable color with no staining of the wrapper or container can be achieved by use of this invention.

In view of the preceeding description and examples, various modifications thereof will be suggested to those skilled in the art and are to be included within the spirit and purview of this application and the scope of the appended claims.

What is claimed is:

1. A natural food colorant for use with margarine packaged in wrappers, said colorant having a yellow color substantially identical with the color of commercial margarines where said commercial margarines are colored with β-carotene, said colorant comprising a mixture of:

A. a first edible material of natural origin which in use amounts does not detract from normal margarine flavor and having a predominately yellowish hue due primarily to carotenoid pigments with a greenish cast due to α-carotene, said first material being present in an amount sufficient to impart said yellowish hue with greenish cast to said margarine, and B. a second edible material of natural origin which in use amounts does not detract from normal margarine flavor and having a predominately reddish hue, in an amount sufficient to negate the greenish cast of said first material and to produce said yellow color, said food colorant characterized by not substantially migrating from margarine containing said colorant to margarine wrappers in contact with said margarine.

2. An oleomargarine colored by the colorant of claim 1.

* * * * *